May 4, 1965 G. S. WING 3,181,413
FASTENING DEVICE WITH LUBRICATING MEANS
Filed May 15, 1959
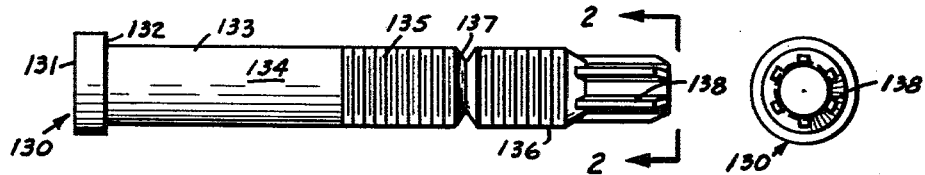
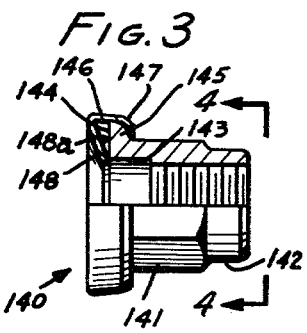
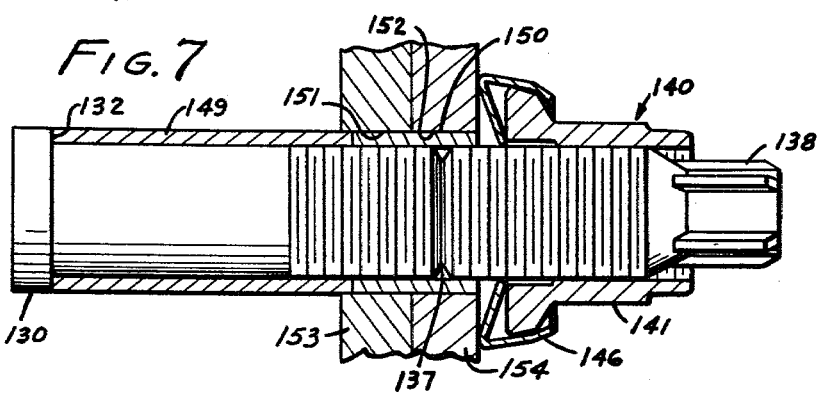
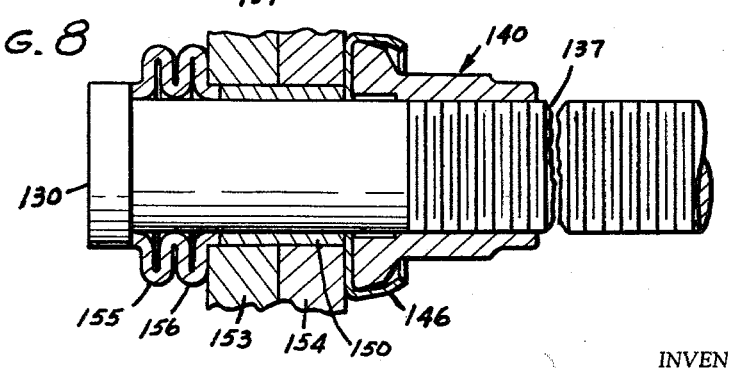
INVENTOR.
GEORGE S. WING
BY *Angus & Mon*
ATTORNEYS.

3,181,413
FASTENING DEVICE WITH LUBRICATING MEANS
George S. Wing, Palos Verdes Estates, Calif., assignor to Hi-Shear Rivet Tool Company, Torrance, Calif., a corporation of California
Filed May 15, 1959, Ser. No. 813,536
3 Claims. (Cl. 85—70)

This invention relates to fasteners for joining articles together of the class commonly known as "blind fasteners"; that is, fasteners which can be utilized to assemble joints by operations which can all be performed from the same side of the work.

A common disadvantage of most blind fasteners is that when they are assembled, they are an integral and permanent unit, and the joint they make up cannot be taken apart and reassembled again without destroying the fastener, and setting another one to reassemble the joint.

Still another objection to many blind fasteners is that they have only moderate fatigue resistance, moderate resiliency for withstanding joint vibration, and moderate resistance to shear forces that are developed by axial loads.

It is an object of this invention to provide a blind fastener which is capable of being installed, and then permitting the joint to be assembled and disassembled without destroying the fastener, and without again going through the original steps. An allied object is to provide a simple blind fastener which may readily be installed, which is capable of receiving bolts that closely fit within it to provide a finally-assembled fastener of maximum shear strength, which has sufficient resilience that it can withstand substantial vibration, and which has significant resistance to shear forces imposed by axial loads.

It is a still further object of the invention to provide a fastener which can act as a nut, by means of which a joint may be assembled simply by the insertion of a separate bolt into the permanently retained nut-like blind fastener.

A blind fastener according to this invention includes a mandrel having a cylindrical shank, a head on the shank, and two sets of exterior threads on the shank separated by a groove. Torque-tool receiving means is provided on the shank adjacent the thread farther from the head.

A tube having a central, axial hole fits over the mandrel and has a region defined by two axially aligned concentric cylindrical walls that is adapted to fail to form a plurality of bulges under compression. A tubular spacer fits over the mandrel and abuts both the said tube and a nut threaded on the other pair of threads.

A washer that bears a lubricant is attached to a rim on the nut to standardize friction forces which occur when the device is set.

According to a preferred but optional feature of the invention, a surface of the washer is made normally frusto-conical, and is adapted to be flattened out by pressure from the nut.

The above and other features of this invention will be fully understood from the following detailed description and the accompanying drawings, of which:

FIG. 1 is an elevation of a portion of the invention;
FIG. 2 is an end view taken at line 2—2 of FIG. 1;
FIG. 3 is a side elevation, partly in cutaway cross-section, showing another portion the invention to be used with the portion shown in FIG. 1;
FIG. 4 is an end view taken at line 4—4 of FIG. 3;
FIG. 5 is a side elevation of still another portion of the fastener to be used with the portions shown in FIGS. 1 and 3;
FIG. 6 is an end view taken at line 6—6 of FIG. 5;
FIG. 7 is a side elevation, partly in cutaway cross-section, showing a fastener comprising the elements of FIGS. 1, 3, and 5 about to be assembled to a workpiece; and
FIG. 8 is a side elevation, partly in cutway cross-section, showing the fastener of FIG. 7 in its set condition;

FIGS. 1–8 show the presently preferred embodiment of the invention. FIG. 1 shows a mandrel member 130 which has a head 131 at one end thereof with a flat annular surface 132 facing toward a shank 133. The shank has a circular cylindrical portion 134 which bears threads 135, 136 at locations spaced from the head. A circumferential groove 137 separates threads 135 and 136.

At the other end of the shank from the head, there are provided axial splines 138 for receiving a torque-applying tool.

FIG. 3 illustrates a nut 140 for use with mandrel member 130. The nut has hexagonal or splined exterior wrench-engaging surfaces 141, a neck section 142 which may, if desired, be pressed out of round for locking purposes, a counterbore 143 adjacent the bearing end 144 of the nut, and a retainer flange 145 also adjacent the bearing end 144. A lubricated washer 146 is held to the bearing end of the nut by a turned-in rim 147 which fits around flange 145. When in its uncompressed shape, the washer has a pair of opposite frusto-conical surfaces 148, 148a, at least one, and preferably both of which, bear a layer (not shown because of its small thickness) of a substantially dry lubricant which preferably comprises a polar wax. The presently-preferred type of lubricant is a polar wax compound, which is substantially dry. One example of this type of compound is sold by S. C. Johnson & Son, Inc., located at Racine, Wisconsin, under the name #153 Wax Lubricant "Tube Draw." This lubricant is provided in an evaporable liquid base. The base evaporates before the lubricant is used as described, leaving the dry wax. A polarized lubricant has been found to be most useful inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

A tube 149 (FIGS. 5, 6) and a cylindrical spacer (FIG. 7) 150 are also provided, which are major portions of the fastener.

The technique for assembling this fastener is evident from FIGS. 7 and 8. FIG. 7 shows the fastener before it is set. As shown therein, tube 149 and spacer 150 are fitted over the mandrel member with tube 149 bearing against annular surface 132. The fastener is positioned so that spacer 150 fits neatly in holes 151, 152 in workpieces 153, 154. Then, a torque tool (not shown) is engaged to splines 138 and to wrench-engaging surfaces 141, and these are counter-rotated while pressing the nut toward the workpieces. The effect of this counter-rotation it to press the central portion of washer 146 against workpiece 154, and thereafter to draw the mandrel to the right in FIG. 7 so as to place tube 149 under compression so that it will fail and provide undulations 155, 156, as shown in FIG. 8. Spacer 150 will not fail, because it is side-supported by the workpieces. Stronger application of torque will cause the mandrel member to fail in torsion at groove 137, and assuming the groove to have been cut to correct dimensions, the fact that a proper torque was exerted will be indicated by the failure of the mandrel member. In the event that neck portion 142 of the nut is pressed out of round, it will have been rounded out again by the mandrel member, and the spring-back forces exerted by the neck portion will hold the nut on the mandrel member, and the fastener will be essentially locked.

The lubricated washer standardizes the frictional forces between the nut and workpiece, thereby eliminating these frictional forces as a variable in determining the axial pre-load as a function of applied torque.

It will be noted that the tube, when compressively, axially-loaded, collapses to provide a plurality of undulations which give the advantages enumerated above. Numerous means of utilizing this feature are provided, which give a wide range of types of fasteners for various applications.

It is, of course, necessary to control the ratio between the wall thickness, the strength of the material, the inner and outer diameters of the tube, and the length of tube between the workpiece and the threads that are engaged by the mandrel, in order that the tube will collapse with the multiplicity of undulations. The following empirical relations are of assistance in determining when a tubing of 305 stainless steel will collapse in such a manner:

| Nominal Size | L | D | d | t | L/D | L/d | L/t | D/t |
|---|---|---|---|---|---|---|---|---|
| 5/16" | .400 | .312 | .266 | .023 | 1.28 | 1.50 | 17.5 | 13.5 |
| 1/4" | .350 | .250 | .206 | .022 | 1.4 | 1.70 | 15.9 | 11.4 |
| 5/32" | .230 | .175 | .141 | .017 | 1.31 | 1.63 | 13.5 | 10.3 |

$L$ is the unconfined length of a fastener to be installed. $D$ is the outer diameter, $d$ the inner diameter, and $t$ the wall thickness of the fastener in this length. The ratios and dimensions may change with materials of different ductility, and there are, of course, materials which are not sufficiently ductile to upset in the illustrated manner. However, the above table of dimensions for one material (305 stainless steel) will serve as a guide in devising suitable dimensions for fasteners using other materials, and also for other sizes utilizing the same material.

A fastener which sets to form two convolutions, or bulges, instead of one, provides several distinct advantages, which include ease in setting the fastener, and substantial resistance to shear developed by axial loads. In order to attain two convolutions on the tube, it is necessary to use a smaller ratio of wall thickness to length than if only one convolution is desired. A thinner wall requires less forces to set the fastener, and this is a considerable advantages in installation. A thin wall fastener which is easy to set but has only one convolution when set, has less shear strength between the upset fastener and the workpiece than one which sets to a double convolution. The double convolution increases that shear strength to an adequate level.

This invention is not to be limited by the examples shown in the drawings and described in the description, which are given by way of example and not of limitation, but only in accordance with the scope of the appended claims.

I claim:

1. A blind fastener comprising: a mandrel comprising a cylindrical shank, a head on such shank adjacent one end thereof, and two sets of exterior threads on the shank spaced from the head, with a groove disposed between the two sets, and torque-tool receiving means at the end of said shank opposite the headed end; a tube having a central axis, an axial hole extending from a first end thereof, a first circular cylindrical surface defining at least a portion of the hole, and a second circular cylindrical surface defining at least a portion of the outside contour of the tube, said cylindrical surfaces being coaxial around the central axis, at least a portion of the second cylindrical surface being axially aligned with at least a portion of the first cylindrical surface, the ratio of length of the axially aligned portions of the cylindrical surfaces, the wall thickness of the said tube, and the radii of the cylindrical surfaces at the axially aligned portions being so proportioned relative to each other that compressive loading of said tube which is exerted by engaging said threads and pulling the mandrel to force the head against the tube to press it toward its first end while opposing movement of the first end, causes the tube to bulge outwardly in at least two axially spaced locations included in the axially aligned portions of the cylindrical surfaces, the said aligned portion being continuous and ungrooved; a nut adapted to be threaded onto the threads; and a tubular spacer; a washer bearing a substantially dry lubricant on at least one surface thereof between the nut and spacer for standardizing frictional forces resulting from tightening down the nut; a flange on the nut adjacent one end, and a turned-in rim on the washer which fits around said flange to hold the washer to the nut; whereby with the tube against the mandrel head and with the spacer between the tube and nut, counter-rotation of said nut and mandrel draw the headed end of the mandrel against the tube in opposition to force exerted by the nut on the spacer, so as to upset the tube at a plurality of axially aligned locations, sufficient torque resulting in torsional failure of the mandrel at the groove.

2. A blind fastener according to claim 1 in which the said washer surface is normally frusto-conical and is adapted to be flattened by pressure from the nut.

3. A blind fastener according to claim 2 in which the nut is normally out of round whereby being threaded onto the threads tends to round it out, and the nut applies springback locking forces against the mandrel.

References Cited by the Examiner
UNITED STATES PATENTS

| | | | |
|---|---|---|---|
| 2,030,165 | 2/36 | Huck | 85—40 |
| 2,099,678 | 11/37 | Curtis | 85—40 |
| 2,225,654 | 12/40 | Olson | 151—37 |
| 2,282,711 | 5/42 | Eklund | 85—40 |
| 2,324,142 | 7/43 | Eklund | 85—40 |
| 2,914,106 | 11/59 | Boyd. | |
| 2,915,934 | 12/59 | LaTorre | 85—40 |
| 2,927,495 | 3/60 | Barwood | 85—50 |
| 2,974,558 | 3/61 | Hodell | 85—40 |

EDWARD C. ALLEN, Primary Examiner.

ARTHUR B. MILLER, CARL W. TOMLIN, Examiners.